(12) United States Patent  
Prager et al.

(10) Patent No.: US 8,412,613 B2
(45) Date of Patent: Apr. 2, 2013

(54) METHOD OF HEDGING RETAIL TRANSACTIONS FOR FUEL

(75) Inventors: Richard L. Prager, Greenwich, CT (US); Paul J. Broderick, Rye, NY (US); Karen Ogden, Larchmont, NY (US)

(73) Assignee: Bank of America Corporation, Charlotte, NC (US)

( * ) Notice: Subject to any disclaimer, the term of this patent is extended or adjusted under 35 U.S.C. 154(b) by 849 days.

(21) Appl. No.: 11/924,836

(22) Filed: Oct. 26, 2007

(65) Prior Publication Data

US 2008/0262892 A1 Oct. 23, 2008

Related U.S. Application Data

(60) Provisional application No. 60/913,399, filed on Apr. 23, 2007.

(51) Int. Cl.
*G06Q 40/00* (2012.01)
(52) U.S. Cl. ............ 705/37; 705/36 R; 705/14.15; 235/381
(58) Field of Classification Search ............ 705/37, 705/36 R, 14.15; 235/381
See application file for complete search history.

(56) References Cited

U.S. PATENT DOCUMENTS 6,980,960 B2 12/2005 Hajdukiewicz et al.
2004/0193480 A1 9/2004 Pinsonnault et al.
2005/0240492 A1 10/2005 Grdina
2006/0036530 A1 2/2006 Shkedy
2006/0218056 A1 9/2006 Dickman
2007/0038553 A1 2/2007 Miller et al.

OTHER PUBLICATIONS

Bank of America Corporation, International Patent Application No. PCT/US08/61298, International Search Report and Written Opinion, dated Aug. 29, 2008.
International Preliminary Report on Patentability and the Written Opinion of the International Searching Authority mailed Nov. 5, 2009 for International Application No. PCT/US2008/0612988.

*Primary Examiner* — Daniel Felten
(74) *Attorney, Agent, or Firm* — Michael A. Springs; Moore & Van Allen PLLC; Patrick B. Horne

(57) ABSTRACT

A method of executing a transaction related to the purchase of fuel. A contract is entered into by a purchaser with a card service provider or financial institution for a certain amount of fuel at a fixed or capped price offered over a predetermined duration. The fuel is purchased from a retail merchant. A payment is made or received by the purchaser depending on the difference between a prevailing retail index price and the fixed or capped price. A premium may be paid for entering into a capped price arrangement. The fixed and capped prices may be related to a retail index price at or before the time the contract is entered into. In another embodiment, the method includes receiving retail price index data for fuel sales and determining fuel sale contract criteria, with a fuel sale contract proposed for a purchaser.

49 Claims, 5 Drawing Sheets

METHOD OF HEDGING RETAIL TRANSACTIONS FOR FUEL

CROSS REFERENCE TO RELATED APPLICATION

This application claims priority from co-pending U.S. provisional application 60/913,399, entitled "Method of Performing Retail Transactions for Fuel," filed Apr. 23, 2007, by the inventors hereof, the entire disclosure of which is incorporated herein by reference.

BACKGROUND

The cost of fuel is volatile, and given that purchasers are largely obligated to use a certain amount of fuel in their personal lives, commutes to work, or businesses over a given period, purchasers have little control over what their costs will be over that period. As an example, operators of fleets of vehicles, such as trucking companies, often identify the second most important factor affecting their income statements, behind vehicle costs, to be fuel costs. Presently, many fleet card service providers, meaning entities that issue credit cards and/or debit cards, and provide related card services to fleet operators, generally lack tools to directly manage fuel cost variability, and budgeting fuel costs may be difficult for operators. The same concerns are valid for individual consumers.

It is common in transactions for relatively large quantities of commodities, including fuel, for purchasers to buy an option to purchase the commodity at some point in the future at a fixed price. Such a call option can be, in effect, insurance against rising prices for large scale commodities dealings on the derivatives market. A call option, however, may not be available to purchasers of lesser quantities, and is not part of the conventional method of retail transactions for fuel.

SUMMARY

In accordance with one embodiment of the present invention, a method of executing a transaction related to the purchase of fuel is provided. The method includes selecting fuel sale contract criteria, including a certain type and volume of fuel to purchase and a certain time period over which to purchase the fuel. A contract is entered into with a card service provider or other entity to purchase the certain amount of fuel, in advance of receiving the fuel, at a fixed price offered by the card service provider. The fuel is purchased from a retail merchant at the merchant's retail price, and the merchant is paid for the fuel received. If the prevailing index price at the time the fuel is purchased from the merchant is higher than the contracted fixed price, a payment is received from the card service provider based on the volume purchased and on the difference between the prevailing index price and the fixed price. If the fixed price is higher than the prevailing retail index price, a payment is made to the card service provider based on the difference between the prevailing retail index price and the fixed price.

In accordance with another embodiment of the present invention, another method of executing a transaction related to the purchase of fuel is provided. The method includes selecting fuel sale contract criteria, including a certain volume and type of fuel to purchase and a certain time period over which to purchase the fuel. A contract is then entered into with a card service provider to purchase the certain amount of fuel, in advance of receiving the fuel, at a capped price offered by the card service provider. The fuel is purchased from a retail merchant at the merchant's retail price, and the merchant is paid for the fuel received. If the index price at the time the fuel is purchased from the merchant is higher than the capped price, a payment is received from the card service provider based on the volume purchased and on the difference between the prevailing retail index price and the capped price. In other embodiments, the card service provider may be paid a premium, which may be paid periodically based on a per unit volume of fuel purchased or paid in a lump sum based on the unit volume of fuel contracted.

In the above embodiments, the fixed and capped prices may be related to a retail index price ("the index").

In accordance with another embodiment according to the present invention, a method of executing a transaction for the sale of fuel is provided. The method includes receiving retail price index data for fuel sales and determining fuel sale contract criteria, including type of fuel, type of hedge, offer price per unit volume to be purchased, and applicable time period for purchase. A fuel sale contract is proposed for a purchaser. The purchaser's acceptance may be received. In another embodiment the fuel sale contract criteria includes grade of fuel.

In accordance with another embodiment of the present invention, a computer readable memory system encoded with a data structure for enabling retail fuel sale hedge purchasing by a purchaser is provided. The memory system is accessible over a network. The data structure includes a plurality of hedge parameter offerings, including volume of fuel, type of fuel, and time period over which the fuel must be purchased, and sales data, including transactions performed in the exercise of the options provided by the hedge.

The features, functions, and advantages can be achieved independently in various embodiments of the present invention or may be combined in yet other embodiments.

BRIEF DESCRIPTION OF THE DRAWINGS

For a more complete understanding of the present invention, reference should now be had to the embodiments shown in the accompanying drawings and described below. In the drawings.

DETAILED DESCRIPTION

Figure 1:
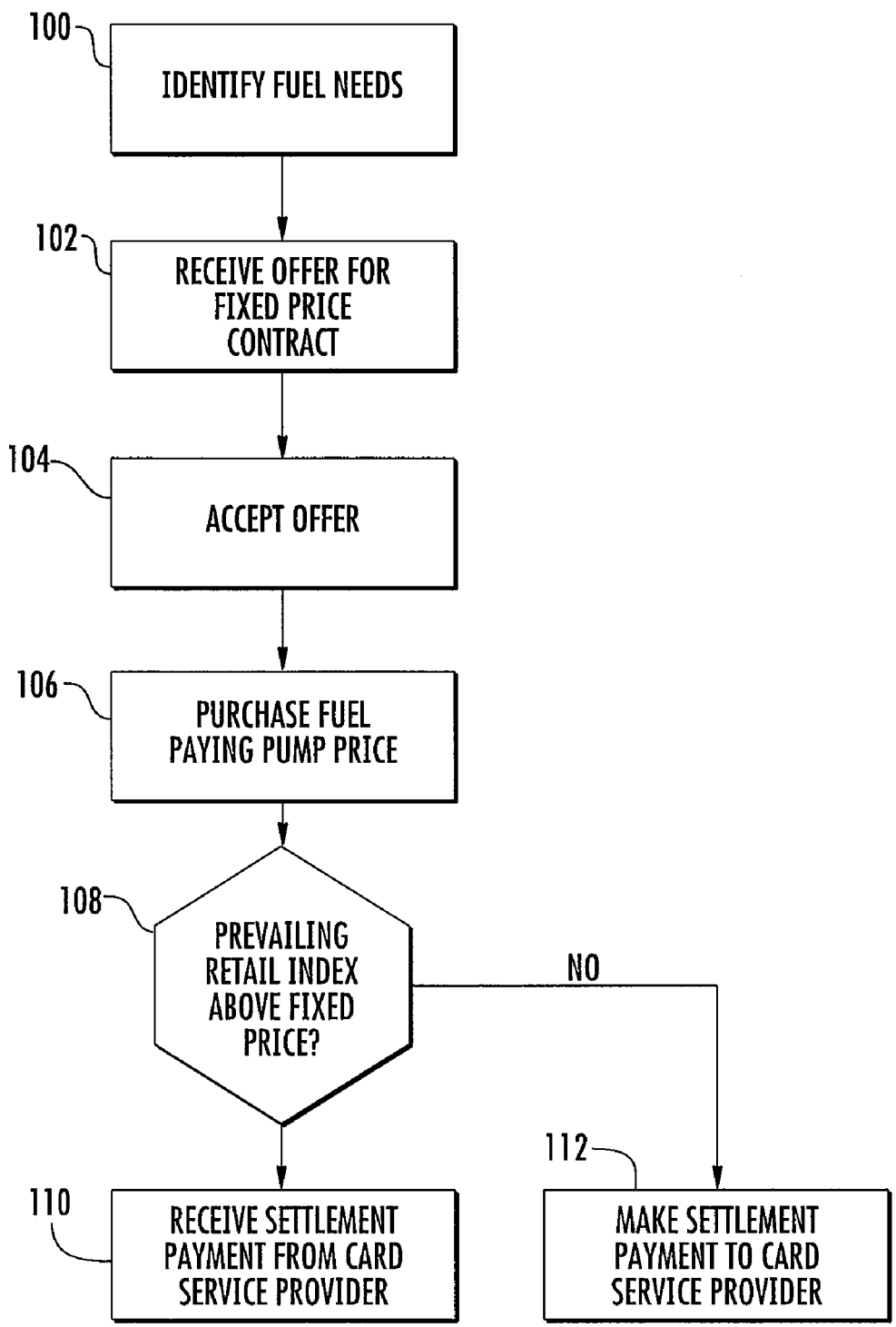
FIG. 1 is a flowchart that illustrates a method of executing a fuel purchase transaction in accordance with a first embodiment of the present invention.

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, steps, processes, and features of various embodiments of systems and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

The embodiments described herein are presented in terms of "purchasers" and "drivers." Such parties may be the same party, as in an individual consumer and driver, or different parties, as in a vehicle fleet operator/purchaser and its drivers. It should be understood that other purchasers may use the present invention as well. References are made to card service providers and to cards; all such references should be understood to include and apply to credit card service providers, debit card service providers, credit cards, debit cards, and the like. Further, embodiments are set forth that include both a card service provider and a financial institution, but in practice these may be the same entity and therefore, whether presented as one or more entities, they should be understood to be additional embodiments of the present invention. References are generally made to fuel; it should be understood that fuel includes, for example, gasoline, gasoline mixed with ethanol, diesel fuel, natural gas, hydrogen, and electricity.

In one embodiment of the present invention, purchasers may be able to fix or cap their fuel price on a specified volume of fuel for a specified time period by establishing a hedge position. The hedge will be effected by contracting to purchase a specified volume of fuel (such as unleaded gasoline or diesel) over a set time period at a pre-determined price. The hedge may be constructed using a retail index of fuel prices. The retail index may be local, regional, national, or set on some other basis. By committing in advance to a specified volume at a fixed or capped price, a purchaser will influence costs incurred for whatever percentage of expected purchases he or she would feel comfortable hedging.

A driver would see no change to his or her typical transaction, wherein the driver purchases from a merchant using a credit or debit card, for example. The purchaser, however, will achieve a degree of budgeting certainty over a line expense item that can show tremendous fluctuation and is generally unrelated to its core competency. The driver, and accordingly the purchaser, pays the price listed at the pump when receiving the fuel, i.e., the merchant's price. Through a series of transactions described below, the purchaser may receive a cash settlement back, or in some cases may need to make an additional payment in settlement of the hedge. The settlement may be calculated and exchanged on a periodic basis with the card service provider.

In a fixed price arrangement, the purchaser contracts to buy a certain volume of fuel at a fixed price. That fixed price may be derived, for example, using the forward curve for wholesale gas prices as published by the New York Mercantile Exchange over a specified period of time as known by one of ordinary skill in the art. When fuel purchases are made from a merchant, a prevailing, contemporaneous retail index price on the fuel purchase date will be referenced. Turning now to the figures, as shown in FIG. 1, the purchaser identifies its fuel needs 100, which includes determining the type and possibly grade of fuel, volume, and time period over which to purchase. Then the purchaser receives an offer 102 for a fixed price contract from its card service provider. The purchaser then may accept the offer 104, and purchases the fuel 106, paying the pump price. If the prevailing retail index is above the fixed price 108, the purchaser will receive a settlement payment from the card service provider as may be reflected in a future statement 110. If the prevailing retail index is below the fixed price 108, the purchaser will make a settlement payment to the card service provider 112, which may be made in response to a future statement. The settlement payment is the difference between the prevailing retail index on the fuel purchase date and the fixed price, and is aggregated on a periodic basis. There is still incentive for the driver to buy gas from the merchant at the lowest pump price possible, since the purchaser will pay the pump price irrespective of the retail index and the fixed price, on which the settlement will be based.

Table 1 shows an example of an aggregated series of transactions in a fixed price contract. The contracted volume is 120 gallons at a fixed price of $2.15 per gallon. The 120 gallons are purchased in six stops at various merchants in 20 gallon increments. The pump price (B) is 20 gallons times the pump price per gallon (A). The prevailing index price per gallon (C) may vary over time. The index price (D) is 20 gallons times the prevailing index price (C) on the purchase date. In this case, the total of the index price (D) of $282.60 less the total of the fixed price paid (E) of $258.00, or $24.60, is the settlement payment due to the purchaser. The pump price per gallon (A) and pump price paid (B), while directly relevant to what the purchaser pays, are irrelevant to the settlement calculation.

TABLE 1

| Stop | Pump Price per gal. (A) | Pump Price (B) | Index Price per gal. (C) | Index Price (D) | Fixed Price (E) |
|---|---|---|---|---|---|
| 1 | $2.23 | $44.60 | $2.24 | $44.80 | $43.00 |
| 2 | $2.26 | $45.20 | $2.26 | $45.20 | $43.00 |
| 3 | $2.28 | $45.60 | $2.29 | $45.80 | $43.00 |
| 4 | $2.38 | $47.60 | $2.36 | $47.20 | $43.00 |
| 5 | $2.49 | $49.80 | $2.47 | $49.40 | $43.00 |
| 6 | $2.53 | $50.60 | $2.51 | $50.20 | $43.00 |
| Total | | $283.40 | | $282.60 | $258.00 |

In a capped price arrangement, the purchaser contracts to buy a certain volume of fuel with a capped price, meaning that the purchaser pays the economics of the prevailing pump price up to the point where the retail index price exceeds the capped price, or cap strike. If the retail index exceeds the capped price, the purchaser pays no more than the capped price, in one embodiment. The purchaser essentially holds an option that will be exercised when the retail index price exceeds the cap strike during the agreed upon time period. The capped price arrangement may include a per gallon service charge, which is, in effect, a premium paid for having the benefit of the option that is not provided by fixed price arrangement. Reconciling payment flow, therefore, is again two-way based on market conditions.

Figure 2:
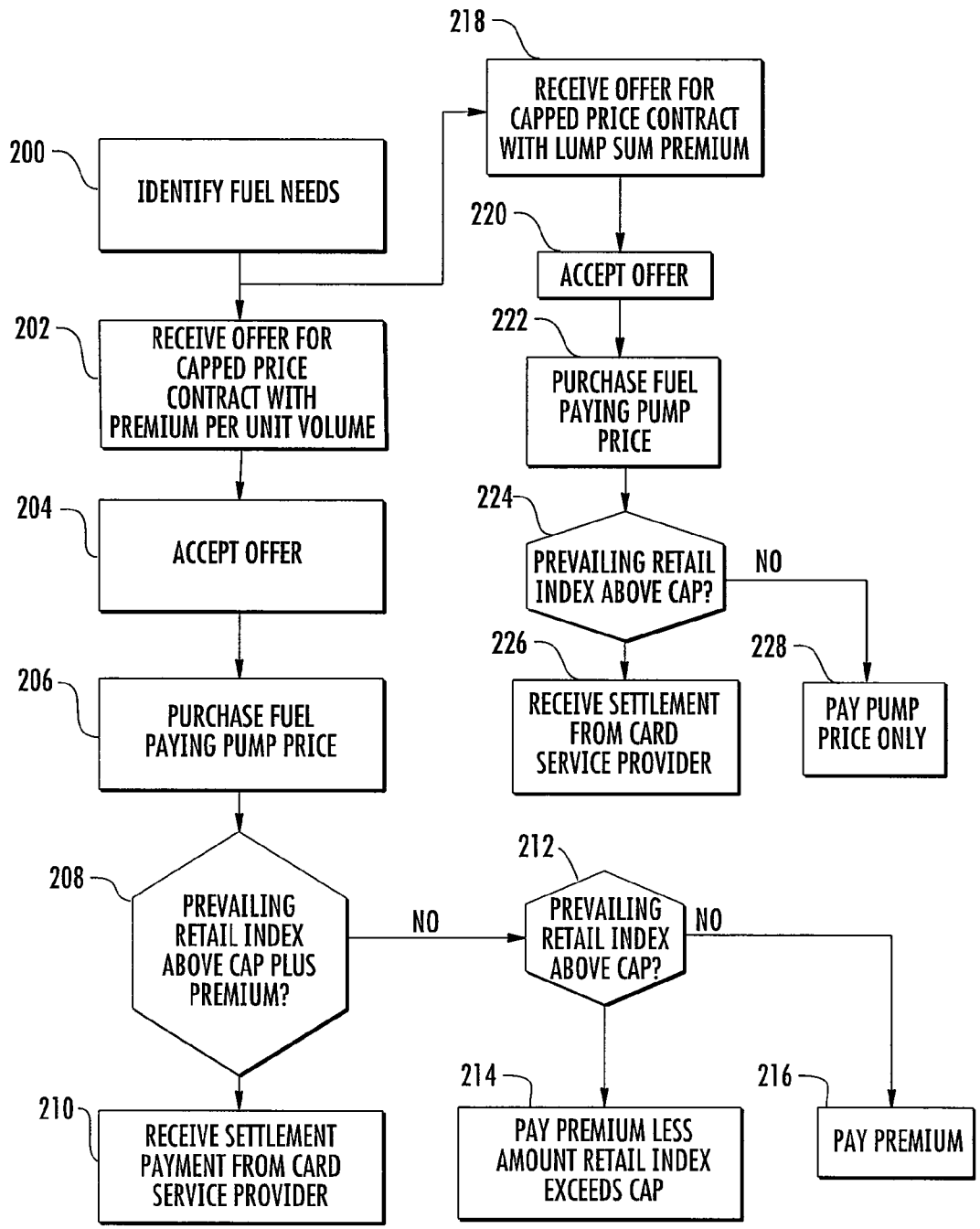
FIG. 2 is a flowchart that illustrates a method of executing a fuel purchase transaction in accordance with a second embodiment of the present invention.

FIG. 2 shows a process by which a purchaser may participate in a capped price contract in which there is a per gallon premium. The purchaser again identifies its fuel needs 200, which includes determining the type and possibly grade of fuel, volume, and time period over which to purchase. Then the purchaser receives an offer 202 for a capped price contract, including a per gallon premium, from its card service provider. The purchaser then may accept the offer 204, and purchases the fuel 206, paying the pump price. If the prevailing retail index is above the cap plus the premium 208, the purchaser will receive a settlement payment from the card service provider 210, as may be reflected in a future statement. The settlement payment 210 is the difference between the prevailing retail index on the fuel purchase date and the sum of the cap and the premium, and is aggregated on a periodic basis. If the prevailing retail index is below the sum of the cap plus premium 208, but above the cap 212, the purchaser will pay the premium less the amount the retail index exceeds the cap 214. If the prevailing retail index is not above the cap 212, meaning it is below the cap, the purchaser will pay the premium 216. Such payment may be made coinciding with a future statement.

FIG. 2 also shows a capped price arrangement where there is a lump sum premium paid. The purchaser receives an offer 218 for a capped price contract, including a lump sum premium, from its card service provider. The purchaser then may accept the offer 220, and purchases the fuel 222, paying the pump price. If the prevailing retail index is above the cap 224, the purchaser will receive a settlement payment from the card service provider 226, as may be reflected in a future statement. The settlement payment 226 is the difference between the prevailing retail index on the fuel purchase date and the cap, and is aggregated on a periodic basis. If the prevailing retail index is below the cap 224, the purchaser will pay only the merchant's pump price 228.

One exemplary embodiment of the present invention for a capped price arrangement is illustrated in Table 2 below. Maturities will be for fixed periods, (e.g., 3, 6 or 12 months). When the retail index increases above the capped price, the purchaser may benefit from price protection. The cap strike price at $2.21, set by a financial institution that may construct the transaction, means that the purchaser may benefit if the index prices rise above $2.21. When the prevailing retail index is less than $2.21, the purchaser payment "floats" such that the purchaser may pay the pump price, as opposed to the capped price. Assume the purchaser buys 50 gallons with a pump price of $2.70 per gallon, an index price of $2.61, and a cap at $2.21. The prevailing retail index of $2.61 is compared to the strike price of $2.21, for an advantage of $0.40 per gallon. In this example, however, there is a per gallon service charge of $0.20, so that reduces the benefit. The calculation of the payout is the $2.61 retail index minus the $2.21 capped price, minus the $0.20 per gallon service charge, times 50 gallons of gas. This particular transaction would result in a payment due to the owner of the cap (the purchaser) of $10.00. Again, there is incentive for the driver to purchase gas from the merchant at the lowest pump price possible, since he or she will pay the pump price irrespective of the index and cap strike, on which the settlement will be based.

TABLE 2

| Cap Strike | $2.21 |
| Date | Apr. 23, 2007 |
| Gallons Purchased | 50 |
| Price at Pump | $2.70 |
| Index | $2.61 |
| Service Charge | $0.20 |
| Payout to purchaser | [(2.61 − 2.21) − 0.20] * 50 = $10 |

Table 3 shows an example of an aggregated series of transactions in a capped price contract. The contracted volume is 120 gallons at a capped price of $2.35 per gallon. The 120 gallons are purchased in six stops at various merchants in 20 gallon increments. The pump price (B) is 20 gallons times the pump price per gallon (A). The prevailing index price (C) may vary over time. The index price (D) is 20 gallons times the index price (C). The cap price (E) is 20 gallons times the cap price per gallon ($2.35). The amount that the index price (D) exceeds the cap price (E) is reflected in column (F); when there is no excess, no entry is made. The premium paid (G) to have the option associated with the cap is 20 gallons times a premium of $0.04 per gallon, or $0.80. The settlement amount (H) is the amount (F) that the index price exceeds the cap price plus the premium (G). The effective price (I) based on the capped arrangement is the pump price (B) less the settlement amount (H). In this case, the settlement payment due to the purchaser is $1.00. The total cap effective price (I) is $282.40. Once again, while the pump fuel price per gallon (A) and pump price paid (B) are directly relevant to what the purchaser pays, they are irrelevant to the settlement calculation.

TABLE 3

| Stop | Pump Price per gal. (A) | Pump Price (B) | Index Price per gal. (C) | Index Price (D) | Cap Price (E) | Index Over Cap Price (F = D − E) | Premium for Cap (G) | Settlement (H = F + G) | Cap Effective Price (I = B − H) |
| --- | --- | --- | --- | --- | --- | --- | --- | --- | --- |
| 1 | $2.23 | $44.60 | $2.24 | $44.80 | $47.00 | — | ($0.80) | ($0.80) | $45.40 |
| 2 | $2.26 | $45.20 | $2.26 | $45.20 | $47.00 | — | ($0.80) | ($0.80) | $46.00 |
| 3 | $2.28 | $45.60 | $2.29 | $45.80 | $47.00 | — | ($0.80) | ($0.80) | $46.40 |
| 4 | $2.38 | $47.60 | $2.36 | $47.20 | $47.00 | $0.20 | ($0.80) | ($0.60) | $48.20 |
| 5 | $2.49 | $49.80 | $2.47 | $49.40 | $47.00 | $2.40 | ($0.80) | $1.60 | $48.20 |
| 6 | $2.53 | $50.60 | $2.51 | $50.20 | $47.00 | $3.20 | ($0.80) | $2.40 | $48.20 |
| Total | | $283.40 | | | | | | $1.00 | $282.40 |

There may be variable pricing structures available. For example, the fixed price could be $3.00, while a cap could be $3.00 with a service charge of $0.20, or the cap could be $3.50 with a service charge of $0.05.

Figure 3:
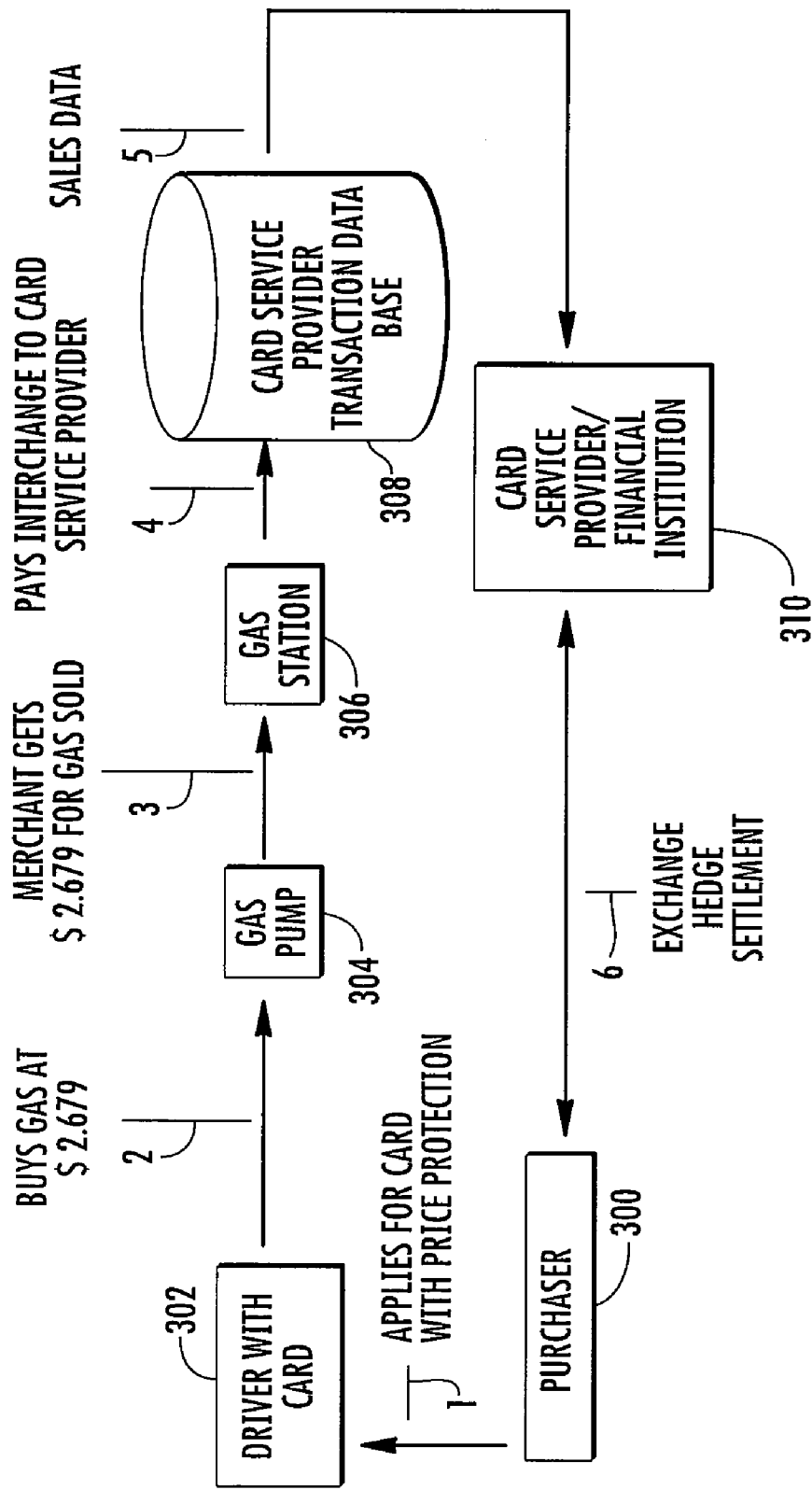
FIG. 3 is a flowchart that illustrates a method of performing transactions related to the purchase and sale of fuel according to an embodiment of the present invention.

FIG. 3 shows an embodiment in which a purchaser 300 applies for a fleet card in step 1 and issues credit cards to its team of drivers 302. As previously noted, the purchaser and driver may be the same individual, family members, fleet operators and drivers, or other entities. The drivers' fuel purchasing rationale is reasonably expected to be consistent with conventional buying, that is, the drivers seek the lowest price at the pump and then pay accordingly. The purchaser 300, through its agent, the driver 302, buys fuel at the pump for $2.679 in step 2, which the merchant receives in step 3 at the gas station 306. The merchant/gas station 306 can transmit the sales data that includes the total sales and may include the price per gallon, the type and grade of fuel, and the number of gallons purchased to the card service provider transaction database 308 in step 4, where the credit card interchange is made. The card service provider may be, for example, companies like Visa, MasterCard, and American Express®, or their respective card issuers. To support this transmission, the card service provider may need to have a closed loop, level three data transmission.

It should again be noted that the financial institution and the card service provider may be the same entity. The sales data is transmitted in step 5 to the card service provider (and possibly financial institution) 310. The card service provider/financial institution 310 and the purchaser 300 exchange the hedge settlement in step 6. At the end of each agreed to period, there is a reconciliation between the purchaser 300 and the card service provider/financial institution 310 based on the actual fuel that was purchased in terms of the quantity, what the retail index was on each purchase date, and what the fixed or capped price (with any service charge) agreed to was. The purchaser 300 realizes the net effect of the risk management through the card service provider's statement. As previously discussed, where the retail index differs from the fixed or capped price, there would be an amount either due to the purchaser or to the card service provider.

Figure 4:
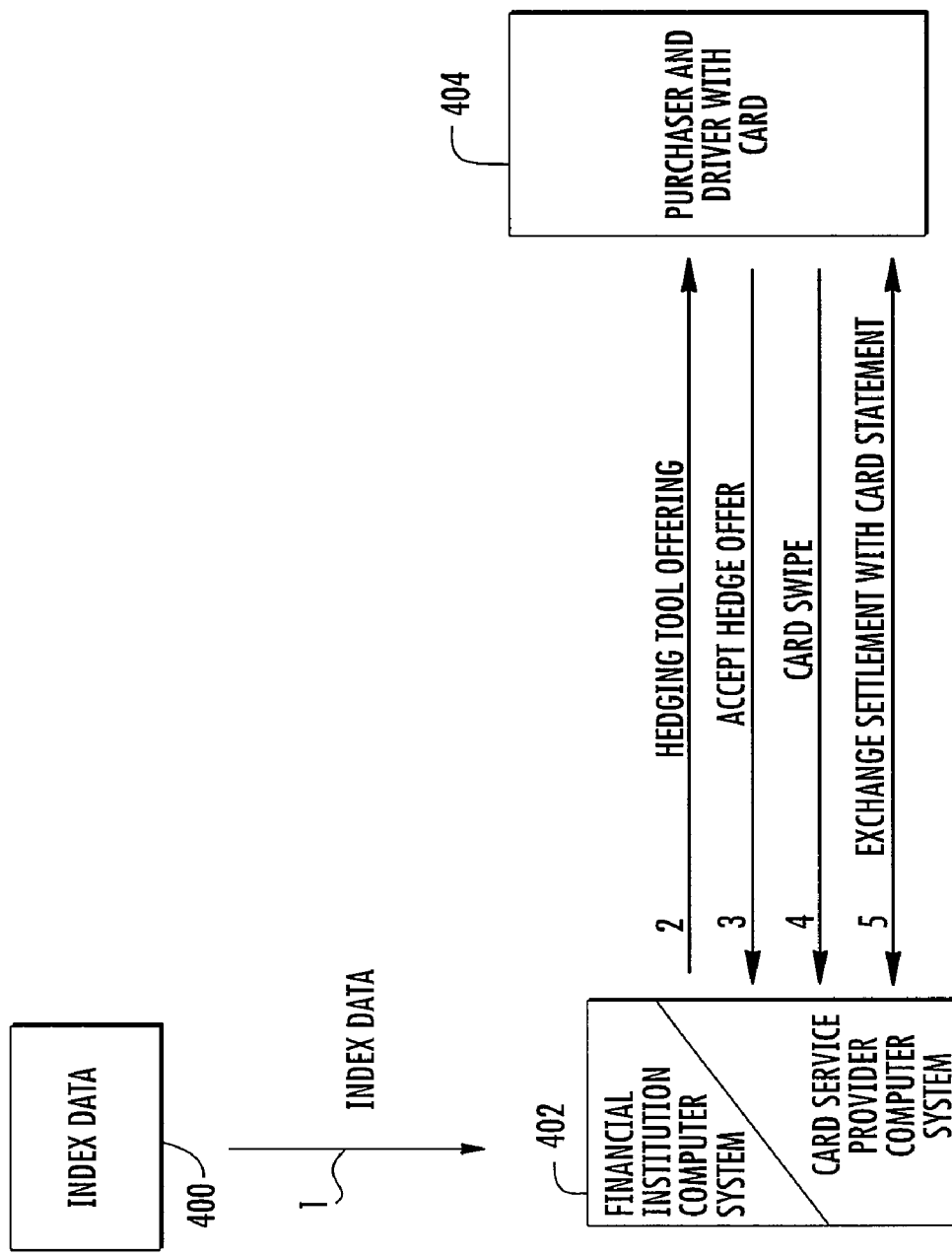
FIG. 4 is a schematic diagram that illustrates an exchange of information associated with the embodiment of FIG. 3.

FIG. 4 further explains how the financial institution and the card service provider perform the transaction in one embodiment. First, in step 1 an original wholesale index 400 is fed into the financial institution pricing tool, which may be resident in a financial institution computer system 402, as known to one of ordinary skill in the computer and software arts. The financial institution pricing tool sets the fixed and capped prices for various maturities, as may be determined with typical market pricing models and considering the spread between wholesale and retail prices. Other factors to review in addition to the retail index 400 in the determination of pricing may include, but are not limited to, forward pricing information for crude oil, as may be published by the New York Mercantile Exchange. Prices may be determined periodically, perhaps every other day or weekly, for example.

The hedging tool offering is made from the financial institution computer system/card service provider computer system 402 to the purchaser 404 in step 2, preferably online, making information about pricing, possibly grade, and the duration of the purchase period (an available hedge selection) available. In step 3 the purchaser 404 accepts the hedge offer. In step 4 the purchaser/driver 404 swipes the card to purchase fuel from the merchant. The financial institution computer system/card service provider computer system 402 uses that information to know that the card had been used on that date and time, how much fuel had been pumped, and the type and possibly grade. The card service provider computer system 402 issues a statement to the purchaser with a hedge settlement section in step 5.

Figure 5:
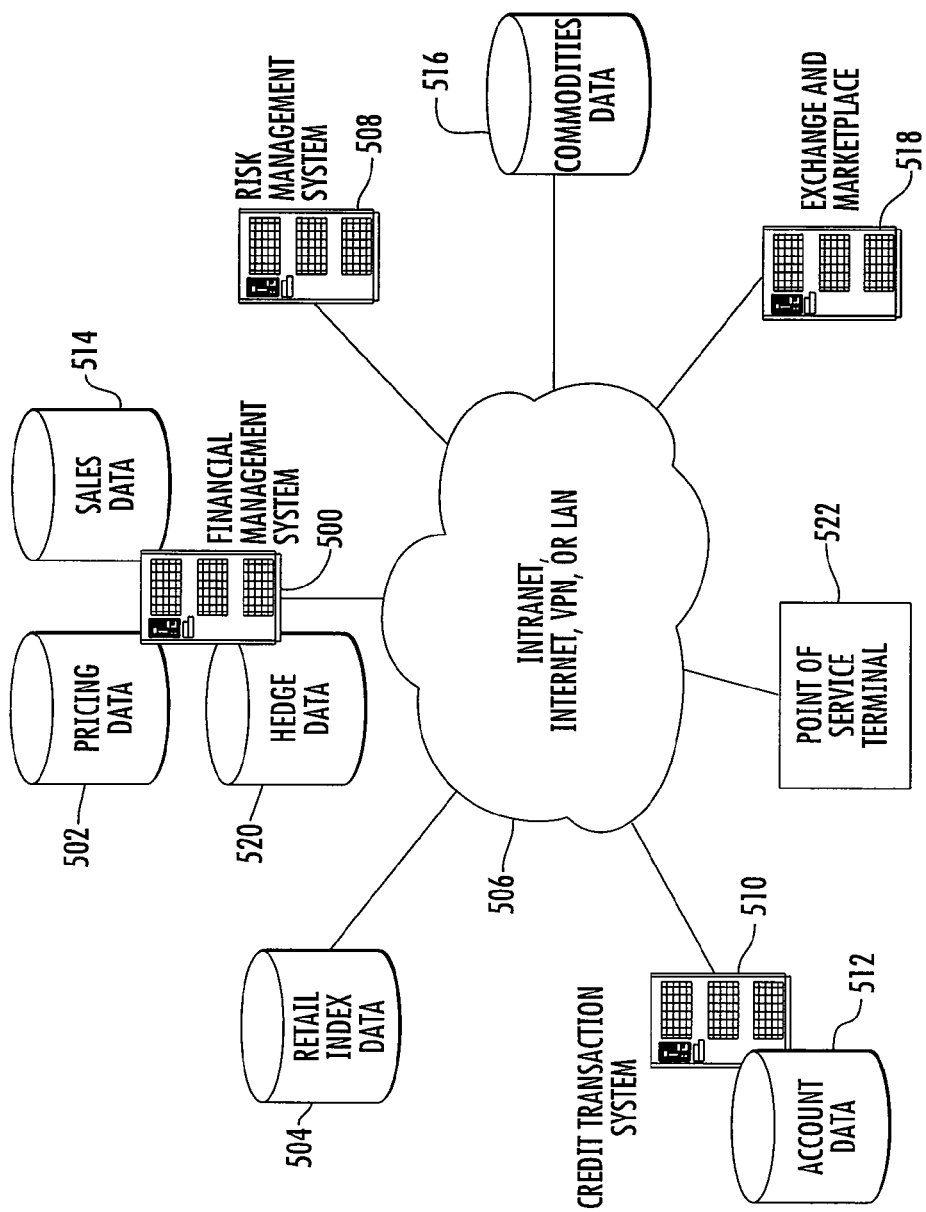
FIG. 5 is a system block diagram according to sample embodiments of the present invention.

FIG. 5 illustrates the system and operating environment of example embodiments of the invention. The financial management system 500 performs calculations related to pricing to set the fixed or capped prices. In this embodiment, pricing data is developed using a pricing tool and is stored in storage medium 502. Retail index data is provided from an external storage medium 504. The connection to data stores and other systems in this embodiment may be formed in part by network 506, which can be an intranet, virtual private network (VPN) connection, local area network (LAN) connection, or any other type of network resources, including the Internet. Stored forms can be local, for example also on fixed storage 502, or stored on the network for example, in data store 504.

The risk management system 508 performs risk management analysis using the credit risk profile of the purchaser as delivered by the credit transaction system 510 with account information from data store 512. The financial institution management system 500 provides aggregated sales data from sales data store 514 to the risk management system 508, which uses commodities information from data store 516, and executes its hedge of gas volumes on the exchange and in the marketplace 518 through trading of wholesale commodity derivatives, based on market fundamentals.

Hedge data for the financial institution, including information on hedges offered and accepted, is maintained in data store 520. The purchaser's selection of the hedging tool is transmitted to the financial institution management system so the financial institution would know, for example, that the purchaser had signed up for 6 months of a fixed price of regular unleaded gas and 200 gallons. The hedge offer and acceptance is preferably performed online. At the point of service terminal 522 the credit or debit card is swiped and the sale is made, initiating the transaction that ends with the settlement at a periodic statement to the purchaser.

In any case, a computer program which implements all or parts of the invention through the use of systems like those illustrated in FIG. 5 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network. Note that the computer usable or computer readable medium could even be paper or another suitable medium upon which the program is printed, as the program can then be electronically captured from the paper and then compiled, interpreted, or otherwise processed in a suitable manner.

Specific embodiments of an invention are described herein. One of ordinary skill in the financial management arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

What is claimed is:

1. A method for executing a transaction with a customer, the transaction related to the purchase of fuel, the method comprising:
 comparing, by a processing device, a prevailing retail index price, at the time the fuel is purchased from a merchant at a retail merchant price, with a predefined price; and
 determining, by the processing device, a settlement amount based at least in part on volume of fuel purchased, the settlement amount further based at least in part on the comparison of the prevailing index price at the time the fuel is purchased from the merchant and the predefined price.

2. The method of claim 1 wherein the predefined price is a fixed price.

3. The method of claim 2, wherein the fuel is purchased from the merchant at the retail merchant price by way of a card issued by a card service provider of a financial institution maintaining a server including the processing device, the financial institution also maintaining an account owned by the customer and associated with the card, the method further comprising:
 debiting the account owned by the customer and associated with the card based on the retail merchant price.

4. The method of claim 2, wherein:
comparing the prevailing retail index price, at the time the fuel is purchased from the merchant at the retail merchant price, with the predefined price comprises:
determining that the prevailing retail index price at the time the fuel is purchased is higher than the fixed price; and wherein:
determining the settlement amount based at least in part on the comparison of the prevailing index price at the time the fuel is purchased from the merchant and the predefined price comprises:
determining the settlement amount based at least in part on the prevailing retail index price at the time the fuel is purchased being higher than the fixed price.

5. The method of claim 4, further comprising:
initiating, by the processing device, a payment to the customer based on the settlement amount.

6. The method of claim 5, wherein:
the fuel is purchased from the merchant at the retail merchant price by way of a card issued by a card service provider of a financial institution maintaining a server including the processing device, the financial institution also maintaining an account owned by the customer and associated with the card; the method further comprising:
debiting, by the processing device, the account owned by the customer and associated with the card based on the retail merchant price, and wherein:
initiating the payment to the customer based on the settlement amount comprises:
crediting the account owned by the customer and associated with the card based on the settlement amount.

7. The method of claim 4, wherein determining the settlement amount comprises:
calculating a difference between the prevailing retail index price at the time the fuel is purchased and the fixed price.

8. The method of claim 2, wherein:
comparing the prevailing retail index price, at the time the fuel is purchased from the merchant at the retail merchant price, with a predefined price comprises:
determining that the prevailing retail index price at the time the fuel is purchased is lower than the fixed price; and wherein:
determining the settlement amount based at least in part on the comparison of the prevailing index price at the time the fuel is purchased from the merchant and the predefined price comprises:
determining the settlement amount based at least in part on the prevailing retail index price at the time the fuel is purchased being lower than the fixed price.

9. The method of claim 8, further comprising:
receiving, by the processing device, a payment from the customer based on the settlement amount.

10. The method of claim 9, wherein:
the fuel is purchased from the merchant at the retail merchant price by way of a card issued by a card service provider of a financial institution maintaining a server including the processing device, the financial institution also maintaining an account owned by the customer and associated with the card; the method further comprising:
debiting, by the processing device, the account owned by the customer and associated with the card based on the retail merchant price, and wherein:
receiving the payment from the customer based on the settlement amount comprises:
debiting the account owned by the customer and associated with the card based on the settlement amount.

11. The method of claim 8, wherein determining the settlement amount comprises:
calculating a difference between the fixed price and the prevailing retail index price at the time the fuel is purchased.

12. The method of claim 2, wherein the comparing and the determining are performed by a processing device of a server maintained by a card service provider of a financial institution, the method further comprising:
initiating issuance, by the processing device, of a card to the customer, the card being associated with a customer account maintained by the card service provider, the method further comprising:
debiting, by the processing device, the account owned by the customer and associated with the card based on the retail merchant price.

13. The method of claim 3, wherein the card is a debit card or a credit card.

14. The method of claim 1, wherein the predefined price is a capped price.

15. The method of claim 14, wherein the fuel is purchased from the merchant at the retail merchant price by way of a card issued by a card service provider of a financial institution maintaining a server including the processing device, the financial institution also maintaining an account owned by the customer and associated with the card, the method further comprising:
debiting the account owned by the customer and associated with the card based on the retail merchant price.

16. The method of claim 14, wherein determining the settlement amount is further based on a premium amount, and wherein, when the prevailing retail index price is greater than the capped price, the settlement amount is based on the prevailing retail index price reduced by the capped price and reduced by the premium amount.

17. The method of claim 14, wherein:
comparing the prevailing retail index price, at the time the fuel is purchased from the merchant at the retail merchant price, with a predefined price comprises:
determining that the prevailing retail index price at the time the fuel is purchased is higher than the capped price; and wherein:
determining the settlement amount based at least in part on the comparison of the prevailing index price at the time the fuel is purchased from the merchant and the predefined price comprises:
determining the settlement amount based at least in part on the difference between the prevailing retail index price at the time the fuel is purchased and the capped price.

18. The method of claim 17, further comprising:
initiating, by the processing device, a payment to the customer based on the settlement amount.

19. The method of claim 18, wherein:
the fuel is purchased from the merchant at the retail merchant price by way of a card issued by a card service provider of a financial institution maintaining a server including the processing device, the financial institution also maintaining an account owned by the customer and associated with the card; the method further comprising:
debiting, by the processing device, the account owned by the customer and associated with the card based on the retail merchant price, and wherein:
initiating the payment to the customer based on the settlement amount comprises:
crediting the account owned by the customer and associated with the card based on the settlement amount.

20. The method of claim 14, wherein:
comparing the prevailing retail index price, at the time the fuel is purchased from the merchant at the retail merchant price, with the predefined price comprises:
determining that the prevailing retail index price at the time the fuel is purchased is lower than the capped price; and wherein:
determining the settlement amount based at least in part on the comparison of the prevailing index price at the time the fuel is purchased from the merchant and the predefined price comprises:
determining the settlement amount based at least in part on the prevailing retail index price at the time the fuel is purchased being lower than the capped price.

21. The method of claim 14, wherein determining the settlement amount comprises:
calculating an index over capped price amount, the index over capped price amount equaling zero when the capped price is higher than the prevailing retail index price and the index over capped price equaling the difference between the prevailing retail index price and the capped price when the prevailing retail index price is higher than the capped price; and
calculating the settlement amount by subtracting a premium amount from the index over capped price amount.

22. The method of claim 21, further comprising:
receiving, by the processing device, a payment from the customer based on the settlement amount when the settlement amount is negative.

23. The method of claim 21, further comprising:
initiating, by the processing device, a payment to the customer based on the settlement amount when the settlement amount is positive.

24. The method of claim 22, wherein:
the fuel is purchased from the merchant at the retail merchant price by way of a card issued by a card service provider of a financial institution maintaining a server including the processing device, the financial institution also maintaining an account owned by the customer and associated with the card; the method further comprising:
debiting, by the processing device, the account owned by the customer and associated with the card based on the retail merchant price, and wherein:
receiving the payment from the customer based on the settlement amount comprises:
debiting the account owned by the customer and associated with the card based on the settlement amount.

25. The method of claim 23, wherein:
the fuel is purchased from the merchant at the retail merchant price by way of a card issued by a card service provider of a financial institution maintaining a server including the processing device, the financial institution also maintaining an account owned by the customer and associated with the card; the method further comprising:
debiting, by the processing device, the account owned by the customer and associated with the card based on the retail merchant price, and wherein:
initiating the payment to the customer based on the settlement amount comprises:
crediting the account owned by the customer and associated with the card based on the settlement amount.

26. A system comprising:
a memory comprising computer-executable code stored therein; and
a processing device configured to execute the computer-executable code to:
compare a prevailing retail index price, at the time the fuel is purchased from a merchant at a retail merchant price, with a predefined price; and
determine a settlement amount based at least in part on volume of fuel purchased, the settlement amount further based at least in part on the comparison of the prevailing index price at the time the fuel is purchased from the merchant and the predefined price.

27. The system of claim 26, wherein the predefined price is a fixed price.

28. The system of claim 27, wherein the fuel is purchased from the merchant at the retail merchant price by way of a card issued by a card service provider of a financial institution maintaining the system, the financial institution also maintaining an account owned by the customer and associated with the card, the processing device further configured to execute the computer-executable code to:
debit the account owned by the customer and associated with the card based on the retail merchant price.

29. The system of claim 26, wherein the processing device is further configured to execute the computer-executable code to:
determine that the prevailing retail index price at the time the fuel is purchased is higher than the fixed price; and
determine the settlement amount based at least in part on the prevailing retail index price at the time the fuel is purchased being higher than the fixed price.

30. The system of claim 29, wherein the processing device is further configured to execute the computer-executable code to:
initiate a payment to the customer based on the settlement amount.

31. The system of claim 30, wherein the fuel is purchased from the merchant at the retail merchant price by way of a card issued by a card service provider of a financial institution maintaining the system, the financial institution also maintaining an account owned by the customer and associated with the card; the processing device further configured to execute computer-executable code to:
debit the account owned by the customer and associated with the card based on the retail merchant price; and
credit the account owned by the customer and associated with the card based on the settlement amount.

32. The system of claim 29, wherein the processing device is further configured to execute the computer-executable code to:
calculate a difference between the prevailing retail index price at the time the fuel is purchased and the fixed price, thereby determining the settlement amount.

33. The system of claim 27, wherein the processing device is further configured to execute the computer-executable code to:
determine that the prevailing retail index price at the time the fuel is purchased is lower than the fixed price; and
determine the settlement amount based at least in part on the prevailing retail index price at the time the fuel is purchased being lower than the fixed price.

34. The system of claim 33, wherein the processing device is further configured to execute the computer-executable code to receive payment from the customer based on the settlement amount.

35. The system of claim 34, wherein:
the fuel is purchased from the merchant at the retail merchant price by way of a card issued by a card service provider of a financial institution maintaining a server including the processing device, the financial institution also maintaining an account owned by the customer and associated with the card; the processing device further configured to execute the computer-executable code to:
debit the account owned by the customer and associated with the card based on the retail merchant price; and
debit the account owned by the customer and associated with the card based on the settlement amount.

36. The system of claim 33, wherein the processing device is further configured to execute the computer-executable code to:
calculate a difference between the fixed price and the prevailing retail index price at the time the fuel is purchased, thereby determining the settlement amount.

37. The system of claim method of claim 27, wherein the processing device is further configured to execute the computer-executable code to:
initiate issuance of a card to the customer, the card being associated with a customer account maintained by a card service provider; and
debit the account owned by the customer and associated with the card based on the retail merchant price.

38. The system of claim 26, wherein the predefined price is a capped price.

39. The system of claim 38, wherein the fuel is purchased from the merchant at the retail merchant price by way of a card issued by a card service provider of a financial institution maintaining the system, the financial institution also maintaining an account owned by the customer and associated with the card, the processing device further configured to execute the computer-executable code to:
debit the account owned by the customer and associated with the card based on the retail merchant price.

40. The system of claim 38, wherein the processing device is further configured to execute the computer-executable code to:
when the prevailing retail index price is greater than the capped price, determine the settlement amount based on the prevailing retail index price reduced by the capped price and reduced by a premium amount.

41. The system of claim 38, wherein the processing device is further configured to execute the computer-executable code to:
determine that the prevailing retail index price at the time the fuel is purchased is higher than the capped price; and
determine the settlement amount based at least in part on the difference between the prevailing retail index price at the time the fuel is purchased and the capped price.

42. The system of claim 41, wherein the processing device is further configured to execute the computer-executable code to:
initiate a payment to the customer based on the settlement amount.

43. The system of claim 42, wherein:
the fuel is purchased from the merchant at the retail merchant price by way of a card issued by a card service provider of a financial institution maintaining the system, the financial institution also maintaining an account owned by the customer and associated with the card; the processing device further configured to execute the computer-executable code to:
debit the account owned by the customer and associated with the card based on the retail merchant price; and
credit the account owned by the customer and associated with the card based on the settlement amount.

44. The system of claim 38, wherein the processing device is further configured to execute the computer-executable code to:
determine that the prevailing retail index price at the time the fuel is purchased is lower than the capped price; and
determine the settlement amount based at least in part on the prevailing retail index price at the time the fuel is purchased being lower than the capped price.

45. The system of claim 38, wherein the processing device is further configured to execute the computer-executable code to:
calculate an index over capped price amount, the index over capped price amount equaling zero when the capped price is higher than the prevailing retail index price and the index over capped price equaling the difference between the prevailing retail index price and the capped price when the prevailing retail index price is higher than the capped price; and
calculate the settlement amount by subtracting a premium amount from the index over capped price amount.

46. The system of claim 45, wherein the processing device is further configured to execute the computer-executable code to:
receive a payment from the customer based on the settlement amount when the settlement amount is negative.

47. The system of claim 45, wherein the processing device is further configured to execute the computer-executable code to:
initiate a payment to the customer based on the settlement amount when the settlement amount is positive.

48. The system of claim 46, wherein:
the fuel is purchased from the merchant at the retail merchant price by way of a card issued by a card service provider of a financial institution maintaining a server including the processing device, the financial institution also maintaining an account owned by the customer and associated with the card; the processing device further configured to execute the computer-executable code to:
debit the account owned by the customer and associated with the card based on the retail merchant price; and
debit the account owned by the customer and associated with the card based on the settlement amount.

49. The system of claim 47, wherein:
the fuel is purchased from the merchant at the retail merchant price by way of a card issued by a card service provider of a financial institution maintaining a server including the processing device, the financial institution also maintaining an account owned by the customer and associated with the card; the processing device is further configured to execute the computer-executable code to:
debit the account owned by the customer and associated with the card based on the retail merchant price;
credit the account owned by the customer and associated with the card based on the settlement amount.

\* \* \* \* \*